United States Patent [19]

Deex

[11] 4,377,681

[45] Mar. 22, 1983

[54] LIQUID CRYSTAL COPOLYESTERS

[75] Inventor: Oliver D. Deex, Clayton, Mo.

[73] Assignee: Monsanto Company, St. Louis, Mo.

[21] Appl. No.: 354,568

[22] Filed: Mar. 4, 1982

[51] Int. Cl.$^3$ ............................................. C08G 63/60
[52] U.S. Cl. ................................. 528/193; 528/194; 528/271
[58] Field of Search ............................. 528/190–195, 528/271

[56] References Cited

U.S. PATENT DOCUMENTS

| | | | |
|---|---|---|---|
| 3,637,595 | 1/1972 | Cottis et al. | 528/193 |
| 3,884,876 | 5/1975 | Cottis et al. | 528/193 |
| 4,064,108 | 12/1977 | Inata et al. | 528/193 |
| 4,075,173 | 2/1978 | Maruyama et al. | 528/193 |
| 4,083,829 | 4/1978 | Calundann et al. | 528/193 |
| 4,267,304 | 5/1981 | Feasey et al. | 528/193 |
| 4,299,756 | 11/1981 | Calundann | 528/193 |

*Primary Examiner*—Lester L. Lee
*Attorney, Agent, or Firm*—R. Bruce Blance; William J. Farrington; Paul D. Matukaitis

[57] ABSTRACT

Disclosed are liquid crystal copolyesters prepared from p-hydroxybenzoic acid, isophthalic acid, hydroquinone and 2,2-bis(4-hydroxyphenyl) propane.

4 Claims, No Drawings

LIQUID CRYSTAL COPOLYESTERS

BACKGROUND OF THE INVENTION

This invention relates to copolyesters of p-hydroxybenzoic acid, isophthalic acid, hydroquinone and 2,2-bis(4-hydroxyphenyl)propane.

The use of objects molded from synthetic polymers has expanded rapidly in the last several decades. In particular, polyesters have widely gained acceptance for general molding applications. Although most polyesters have mechanical properties suitable for general molding applications, most polyesters are not suitable for high strength service because the mechanical properties are not sufficiently high. One group of polyesters that is suitable for high strength service without the need of a reinforcing agent is a new class of polymers exhibiting a general overall balance of mechanical properties substantially enhanced over previous polymers. These polymers have been described by various terms, including "liquid crystalline", "liquid crystal", and "anisotropic". Briefly, the polymers of this new class are thought to involve a parallel ordering of the molecular chains. The state wherein the molecules are so ordered is often referred to either as the liquid crystal state or the nematic phase of the liquid crystal state. These polymers are prepared from monomers which are generally long, flat and fairly rigid along the long axis of the molecule and have chain extending linkages that are either coaxial or parallel. For example, liquid crystal copolyesters have been prepared from the following fairly rigid molecular species: p-hydroxybenzoic acid, hydroquinone and isophthalic acid. However when ratios of the monomers are selected to provide tractable polymers, the glass transition temperature is generally low and the high temperature mechanical properties are reduced.

Applicant has now found that tractable copolyesters of enhanced glass transition temperature can be prepared from p-hydroxybenzoic acid, isophthalic acid, hydroquinone and a surprisingly small ratio of 2,2-bis(4-hydroxyphenyl)propane and that the enhancement in glass transition temperature is achieved without sacrifice in liquid crystallinity. Thus the copolyesters of the present invention are capable of forming a thermotropic melt phase at a temperature below about 340° C., have an inherent viscosity of at leat 0.3, and a glass transition temperature of at least 160° C. and consist essentially of the following divalent radicals:

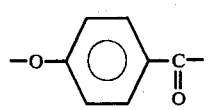

(A)

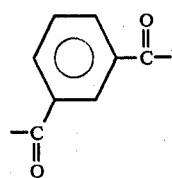

(B)

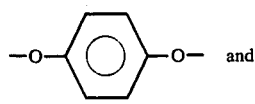

(C)

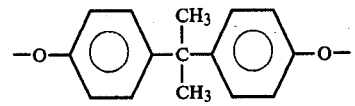

(D)

wherein the range of radical A is from 10 to 40 mole percent of the copolyester and the range of radical C is from 82 to 95 mole percent of the total of radicals C and D.

The copolyesters of the present invention are prepared by an acidolysis procedure in which esters of monocarboxylic acids such as acetic acid are prepared by esterification of the phenolic hydroxy groups of p-hydroxybenzoic acid, hydroquinone and 2,2-bis-(4-hydroxyphenyl)propane and the esters are reacted with isophthalic acid at a temperature in the range of about 250° to about 340° C. The esters can be prepared in situ by reaction of the phenols with acetic anhydride.

In general the copolyester should have an inherent viscosity of at least about 0.3 and more preferably at least about 0.5 in order to provide adequate mechanical properties. The inherent viscosity can, if desired, be increased to values of 0.7 or even higher using conventional techniques such as melt or solid state polymerization. The inherent viscosity is determined at 30° C. with a solution of 0.5 gram of copolyester per 100 ml of a solvent composed of 60 parts by weight of phenol and 40 parts by weight of tetrachloroethane.

The liquid crystallinity of the copolyesters can be demonstrated from the optical anisotropy of the melt above the flow temperature and from the melt viscosity behavior versus rate of shear. The degree of ordering in the melt produces a thixotropic effect and the melt viscosity can reach extremely high values at low rates of shear depending on the degree of ordering of the polymer molecules in the melt.

Advantageously the ratios of monomers in the copolyesters of the present invention can be selected to provide copolyesters which are tractable at a low temperature, the flow temperature at which they form a thermotropic melt phase being substantially below 340° C. and to have a high long-term use temperature associated with the high glass transition temperature. Preferably the glass transition temperature is at least about 160° C. Among the preferred compositions, are copolyesters containing from about 20 to about 35 mole percent p-hydroxybenzoic acid units, and copolyesters containing from about 5 to about 12 mole percent of 2,2-bis(4-hydroxyphenyl)propane based on the total of hydroquinone and 2,2-bis(4-hydroxyphenyl)propane.

The copolyesters of the present invention can contain nucleating agents, fillers, pigments, glass fibers, mineral reinforcing agents, antioxidants, stabilizers, plasticizers, lubricants, fire-retardants and other additives.

The copolyesters are useful for preparing molded objects, films, fibers and the like. For example, they may be injection molded by conventional means and they may be formed into fibers by melt spinning and subsequently drawn, and further processed according to conventional techniques.

The invention is further illustrated but is not intended to be limited by the following examples in which parts and percentages are by weight unless specified otherwise.

EXAMPLE 1

A mixture of 0.1 parts by weight Na$_3$PO$_4$ 12H$_2$O, 10.0 parts by weight (0.072 mol) p-hydroxy benzoic acid, 7.2 parts by weight (0.065 mol) hydroquinone, 1.7 parts by weight (0.007 mol) 2,2-bis(4-hydroxyphenyl) propane, 12.1 parts by weight (0.073 mol) isophthalic acid and 25 parts by weight (0.244 mol) acetic anhydride is placed in a reaction vessel equipped with a stirrer and a condenser. The mixture is heated under a nitrogen blanket at reflux (130° C.) for about one hour. Next the temperature of the bath is raised slowly to 250° C. and approximately 16 parts by weight acetic acid and acetic anhydride is distilled. There is a brief cessation of acetic acid distillation after the ester, acetic acid and excess anhydride distills, but at 250° C. polymerization soon starts and more acetic acid distills. The batch temperature is raised at a rate sufficient to keep the acetic acid distilling at a reasonable rate. When about 28 parts by weight (total) distillate is collected and the reaction temperature is about 290°-300° C., vacuum is gradually applied to finish the reaction. When the reaction is finished, as evidenced by the melt viscosity of the polymer, the reactor is allowed to cool under N$_2$. The polymer is light tan in color and highly crystalline. The inherent viscosity, measured in 60/40 W/W phenol/symtetrachloroethane at a concentration of 0.5 g polymer/100 ml solvent is 0.70. It can be readily molded into articles or drawn into fibers. The melt is very anisotropic when viewed under crossed polarizers. The liquid crystal behavior is demonstrated by the melt viscosity behavior. A log-log plot of apparent melt viscosity versus shear rate shows a substantial approximately linear decrease over a range of shear rates from 0.2 sec$^{-1}$ to 1500 sec$^{-1}$.

The glass transition temperature of the polymer is 175° C. and the melt temperature is 320° C.

The polymer is melt extruded from a 1 oz. Arburg extruder at a temperature of 337° C., the hold time in the extruder being 25 sec. The mold temperature is 145° C. and the injection time is 0.7 sec. The tensile strength of a bar of polymer (1.25 cm×0.32 cm) is 123 MPa with elongation at failure of 10%. The notched Izod impact strength of bars 0.32 cm thick is 134 J/m notch.

EXAMPLE 2

A polyester comprising 33.3 mol percent p-hydroxybenzoic acid units, 33.3 mol percent isophthalic acid units, 28.3 mol percent hydroquinone units and 5 mol percent 2,2-bis(4-hydroxyphenyl) propane units is prepared by the method of Example 1. The inherent viscosity of the polyester is 0.57. The glass transition temperature is 181° C. and the melt temperature is 315° C. The polyester melt is very anisotropic when it is viewed under crossed polarizers. The apparent melt viscosity at 320° C. is about 5×10=poise at a shear rate of 3 sec$^{-1}$ and 3×10$^3$ poise at a shear rate of 1000 sec$^{-1}$. In contrast a non-liquid crystal polymer polyethylene terephthalate in a melt at 5° C. is above its melting point is Newtonian in its apparent melt viscosity behavior at shear rates in the range 2 sec$^{-1}$ to 300 sec$^{-1}$, the melt viscosity being 4×10$^3$ poise.

EXAMPLE 3

A polyester comprising 33.3 mol percent p-hydroxybenzoic acid, 33.3 mol percent isophthalic acid units, 26.6 mol percent hydroquinone units and 6.67 mol percent 2,2-bis(4-hydroxyphenyl) propane units is prepared by the method of Example 1. The inherent viscosity of the polyester is 0.74. The glass transition temperature is 190° C. The polyester is amorphous and does not possess a sharp melting point. The melt exhibits no anisotropy when it is viewed under crossed polarizers.

EXAMPLES 4-7

Further Examples 4-7 of copolyester compositions were prepared by the process of Example 1. The compositions and melting behavior of the copolyesters are set forth in Table 1 along with data for Examples 1-3. Examples 4-7 give anisotropic melts.

Examples 5 and 7 with higher levels of p-hydroxybenzoic acid are high melting and intractable. However, the Examples show the significant increase in glass transition temperature which occurs with the introduction of minor amounts of 2,2-bis(4-hydroxyphenyl) propane into the polyester (Examples 1, 2 and 3 versus Example 6 and Example 5 versus Example 7).

EXAMPLE 8

A copolyester of the composition of example 2 is prepared at an inherent viscosity of 0.41. The apparent melt viscosity shows a linear decrease from 5.7×10$^5$ poise at a shear rate of 0.4 sec.$^{-1}$ to 3.3×10$^3$ poise at a shear rate of 10$^3$ sec.$^{-1}$. Below 0.4 sec.$^{-1}$, the viscosity is near Newtonian, and is almost constant with decrease in shear rate.

TABLE 1

COPOLYESTER OF P-HYDROXYBENZOIC ACID, ISOPHTHALIC ACID, HYDROQUINONE AND 2,2-BIS (4-HYDROXYPHENYL) PROPANE

| Example | Copolymer Composition, mol % | | | | T$_g$, °C. | T$_m$, °C. |
|---|---|---|---|---|---|---|
| | P | I | H | BPA | | |
| 1 | 33.3 | 33.3 | 30.0 | 3.33 | 175 | 120 |
| 2 | 33.3 | 33.3 | 28.3 | 5.00 | 181 | 315 |
| 3 | 33.3 | 33.3 | 26.6 | 6.67 | 190 | a |
| 4 | 20.0 | 40.0 | 36.0 | 4.0 | 180 | 334 |
| 5 | 50.0 | 25.0 | 20.0 | 5.0 | 190 | 360 |
| 6 | 33.3 | 33.3 | 33.3 | 0 | 110 | 333 |
| 7 | 50.0 | 25.0 | 25.0 | 0 | 115 | 360 |

P = p-hydroxybenzoic acid
I = isophthalic acid
H = hydroquinone
BPA = 2,2-bis(4-hydroxyphenyl)propane
T$_g$ = glass transition temperature
T$_m$ = thermotropic melt temperature
a = amorphous

What is claimed is:

1. A copolyester capable of forming a thermotropic melt phase at a temperature below about 340° C. and having a glass transition temperature of at least about 160° C. and an inherent viscosity determined at 30° C. with a solution of 0.5 gram of copolyester per 100 ml of a solvent composed of 60 parts by weight of phenol and 40 parts by weight of tetrachloroethane of at least about 0.3, consisting essentially of the following divalent radicals:

(A)

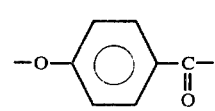

-continued (B) 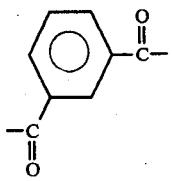

(C) 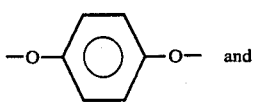 and

-continued (D) 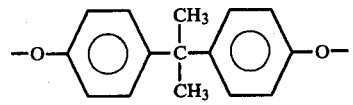

wherein the range of radical A is from 10 to 40 mol percent of the copolyester and the range of radical C is from 82 to 95 mole percent, of the total of radicals C and D.

2. The copolyester of claim 1 wherein the range of radical A is from 20 to 35 mole percent of the copolyester.

3. The copolyester of claim 2 wherein the range of radical C is 88 to 95 mole percent of the total of radicals C and D.

4. The copolyester of claim 2 or 3, wherein the inherent viscosity is at least 0.5.

* * * * *